United States Patent
Liu et al.

(10) Patent No.: US 8,749,670 B1
(45) Date of Patent: Jun. 10, 2014

(54) DIGITAL CAMERA AND IMAGE SENSOR READOUT METHOD WITH BLACK LEVEL CALIBRATION

(71) Applicant: Himax Imaging Limited, Tainan (TW)

(72) Inventors: Chin-Min Liu, Tainan (TW); Ching-Fong Chen, Tainan (TW)

(73) Assignee: Himax Imaging Limited, Tainan (TW)

( * ) Notice: Subject to any disclaimer, the term of this patent is extended or adjusted under 35 U.S.C. 154(b) by 0 days.

(21) Appl. No.: 13/778,899

(22) Filed: Feb. 27, 2013

(51) Int. Cl.
*H04N 9/64* (2006.01)
(52) U.S. Cl.
USPC .......................................................... 348/243
(58) Field of Classification Search
USPC ................................................. 348/241, 243
See application file for complete search history.

(56) References Cited

U.S. PATENT DOCUMENTS

| | | | | |
|---|---|---|---|---|
| 6,563,364 | B2 * | 5/2003 | Lee et al. ...................... | 327/337 |
| 6,597,395 | B1 * | 7/2003 | Kim et al. .................. | 348/222.1 |
| 7,236,203 | B1 * | 6/2007 | Hojabri ........................ | 348/379 |
| 7,259,787 | B2 * | 8/2007 | McDermott .................. | 348/243 |
| 7,817,197 | B2 * | 10/2010 | Noguchi ....................... | 348/243 |
| 8,115,835 | B2 * | 2/2012 | Noguchi et al. .............. | 348/243 |
| 8,218,038 | B2 * | 7/2012 | Dong et al. ................... | 348/243 |
| 8,253,827 | B2 * | 8/2012 | Liu et al. ...................... | 348/243 |
| 2008/0218609 | A1 * | 9/2008 | Blanquart et al. ............ | 348/243 |

\* cited by examiner

*Primary Examiner* — Ngoc-Yen Vu
(74) *Attorney, Agent, or Firm* — McClure, Qualey & Rodack, LLP

(57) ABSTRACT

A digital camera and an image sensor readout method with black level calibration are disclosed. In a readout circuit of the digital camera, a black reference for black level calibration and an analog-to-digital conversion reference voltage for analog-to-digital conversion are generated from reference voltages provided by one voltage ladder. Device-to-device variations of sensor characteristics are considered when selecting the reference voltage for generating the black reference, and, a gain between the selected reference voltage and the black reference varies with a gain of a programmable gain amplifier coupled after a compensator. The compensator subtracts the black reference from a sensed signal that the readout circuit receives from an image sensor of the digital camera.

12 Claims, 4 Drawing Sheets

DIGITAL CAMERA AND IMAGE SENSOR READOUT METHOD WITH BLACK LEVEL CALIBRATION

BACKGROUND OF THE INVENTION

1. Field of the Invention

The present invention relates to digital cameras, and in particular relates to image sensor readout techniques with black level calibration.

2. Description of the Related Art

A digital camera is a camera that takes video or still photographs, or both, digitally by recording images by an image sensor. The image sensors most currently used are digital charge-coupled device (CCD) or complementary metal-oxide-semiconductor (CMOS) active pixel sensors.

To produce an image of high quality, a black level calibration is required in a readout process of an image sensor, wherein a temporal offset due to changing supply voltages, temperatures, and the like is compensated for.

A black level calibration design with high stability is called for.

BRIEF SUMMARY OF THE INVENTION

A digital camera and an image sensor readout method with black level calibration are disclosed.

A digital camera in accordance with an exemplary embodiment of the invention comprises an image sensor and a readout circuit. The image sensor comprises an array of pixel sensors. The readout circuit is coupled to the image sensor to receive a sensed signal, and comprises a compensator, a programmable gain amplifier, an analog-to-digital converter, a digital black level calibration unit and a feed-forward control design.

The compensator subtracts a black reference from the sensed signal to generate a first analog signal. The programmable gain amplifier amplifies the first analog signal to generate a second analog signal. The analog-to-digital converter is controlled by an analog-to-digital conversion reference voltage, to convert the second analog signal to a first digital signal. The digital black level calibration unit generates black level calibrated digital data in different color spaces based on the first digital signal.

The feed-forward control design comprises a voltage ladder, a first gain stage, a multiplexer and a second gain stage. The voltage ladder generates reference voltages of different levels. The first gain stage amplifies a specific one of the reference voltages to generate the analog-to-digital conversion reference voltage. The multiplexer receives the reference voltages generated by the voltage ladder and outputs one of the received reference voltages according to sensor characteristics of the image sensor. The second gain stage amplifies the reference voltage output from the multiplexer to generate the black reference. Note that a gain of the second gain stage varies with a gain of the programmable gain amplifier.

In another exemplary embodiment, an image sensor readout method with black level calibration for a digital camera is disclosed and comprises the following steps:

Receive a sensed signal from an image sensor of the digital camera, wherein the image sensor comprises an array of pixel sensors.

Subtract a black reference from the sensed signal to generate a first analog signal.

Amplify the first analog signal to generate a second analog signal.

Convert the second analog signal to a first digital signal in accordance with an analog-to-digital conversion reference voltage.

Generate black level calibrated digital data in different color spaces based on the first digital signal.

The analog-to-digital conversion reference voltage is generated by amplifying a specific one of a plurality of reference voltages generated by a voltage ladder. The black reference is generated by amplifying one of the plurality of reference voltages selected according to sensor characteristics of the image sensor. Note that a gain between the selected reference voltage and the black reference varies with a gain between the first and second analog signals.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description shows several exemplary embodiments carrying out the invention. This description is made for the purpose of illustrating the general principles of the invention and should not be taken in a limiting sense. The scope of the invention is best determined by reference to the appended claims.

A digital camera in accordance with an exemplary embodiment of the invention comprises an image sensor and a readout circuit.

Figure 1:
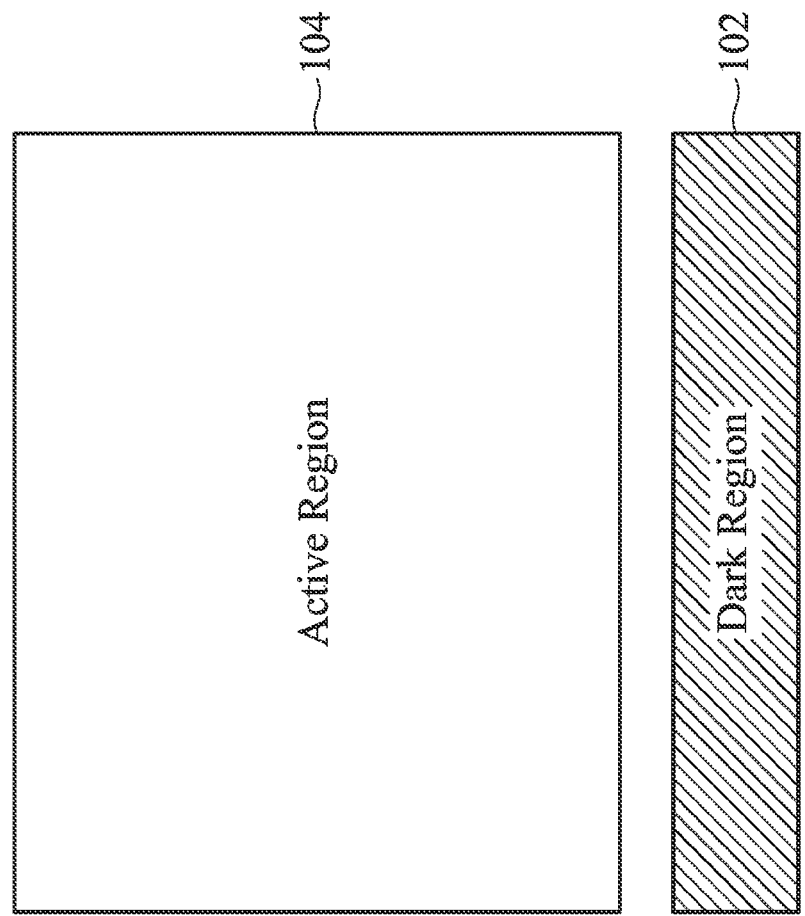
FIG. 1 depicts an image sensor 100 in accordance with an exemplary embodiment of invention, which comprises an array of pixel sensors wherein some of the pixel sensors are within a dark region 102 while the other pixel sensors are within an active region 104.

FIG. 1 depicts an image sensor 100 in accordance with an exemplary embodiment of invention, which comprises an array of pixel sensors. Some of the pixel sensors are disposed within a dark region 102 while the rest of the pixel sensors are disposed within an active region 104. The pixel sensors within the dark region 102 are designed for black level calibration, which are covered by a plate (e.g. a metal plate) and thereby are shielded from light. On the contrary, the pixel sensors within the active region 104 are not shielded from light and are designed to sense images.

Figure 2:
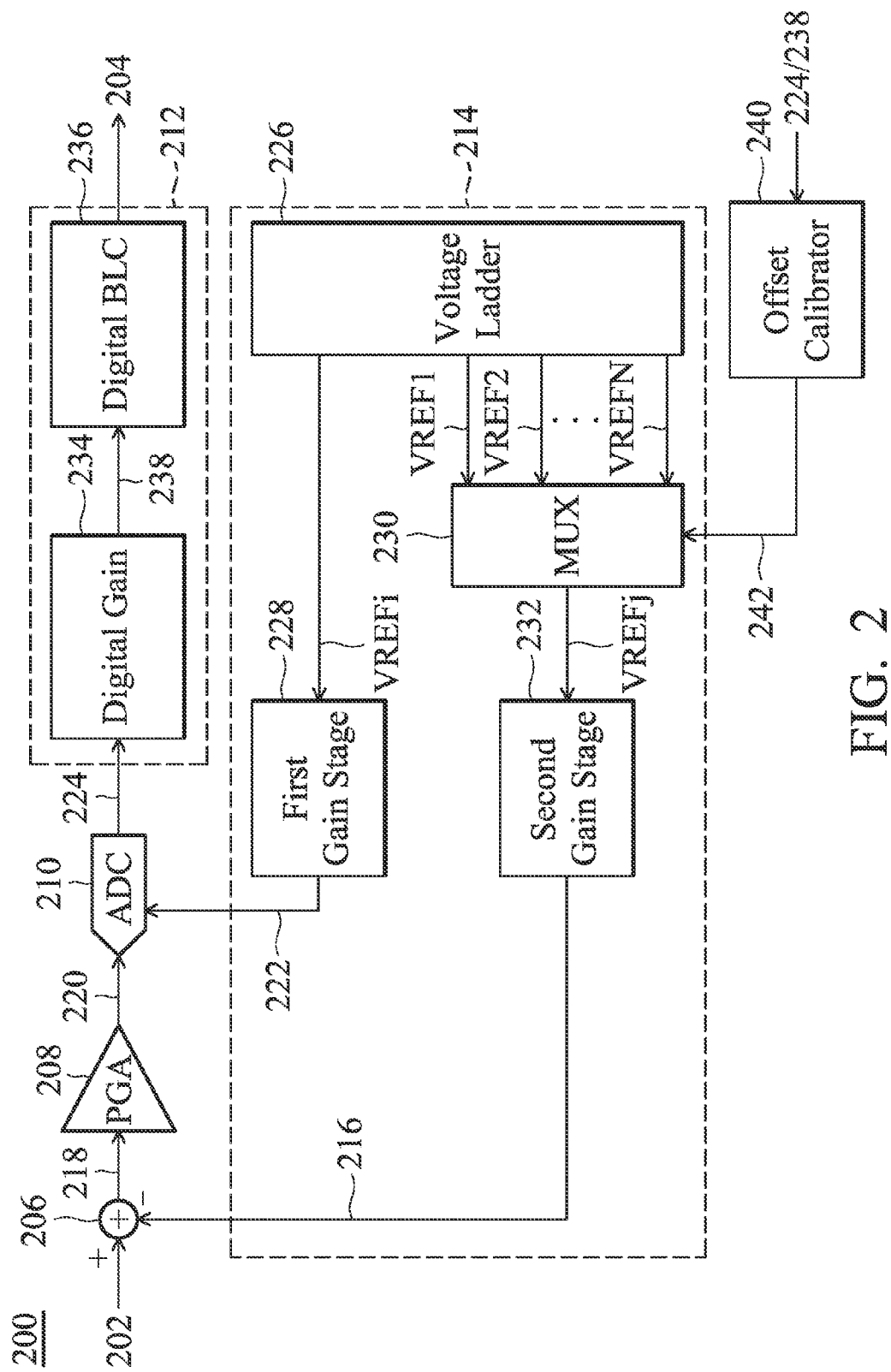
FIG. 2 depicts a readout circuit 200 in accordance with an exemplary embodiment of the invention, which receives a sensed signal 202 from the image sensor 100 and outputs black level calibrated digital data 204 in different color spaces for image signal processing (ISP)

FIG. 2 depicts a readout circuit 200 in accordance with an exemplary embodiment of the invention, which receives a sensed signal 202 from the image sensor 100 and outputs black level calibrated digital data 204 in different color spaces for image signal processing (ISP). The readout circuit 200 comprises a compensator 206, a programmable gain amplifier (PGA) 208, an analog-to-digital converter (ADC) 210, a digital black level calibration unit 212 and a feed-forward control design 214.

The compensator 206 subtracts a black reference 216 from the sensed signal 202 to generate a first analog signal 218. The programmable gain amplifier 208 amplifies the first analog signal 218 to generate a second analog signal 220. The analog-to-digital converter 210 is controlled by an analog-to-digital conversion reference voltage 222 to convert the second analog signal 220 to a first digital signal 224. The digital black level calibration unit 212 generates the black level calibrated digital data 204 based on the first digital signal 224.

The generation of the black level calibrated digital data 204 depends on the feed-forward control design 214, which is always stable. As shown, the feed-forward control design 214 comprises a voltage ladder 226, a first gain stage 228, a multiplexer (MUX) 230 and a second gain stage 232. The voltage ladder 226 generates reference voltages VREF1 to VREFN of different levels. The first gain stage 228 amplifies a specific one (e.g. VREFi) of the reference voltages VREF1 to VREFN to generate the analog-to-digital conversion reference voltage 222. The multiplexer 230 receives the reference voltages VREF1 to VREFN generated by the voltage ladder 226 and outputs one of the received reference voltages (e.g. VREFj) according to sensor characteristics of the image sensor 100, and the second gain stage 232 amplifies the reference voltage VREFj output from the multiplexer 230 to generate the black reference 216. The sensor characteristics may depend on the supply voltage, the temperature or process variation and so on. By properly controlling the selection made by the multiplexer 230, the device-to-device variations of sensor characteristics are taken into account when generating the black reference 216.

Further, note that the reference voltage VREFi for generating the analog-to-digital conversion reference voltage 222 and the reference voltage VREFj for generating the black reference 216 are from the same voltage generator—the voltage ladder 226. In this manner, the light beating problem of the captured video is mitigated.

Further, note that a gain of the second gain stage 232 varies with a gain of the programmable gain amplifier 208. When capturing images by the pixel sensors within the action region 104, the gain of the programmable gain amplifier 208 and the gain of the second gain stage 232 may depend on the environmental brightness. For example, the brighter the environment is, the lower gain is provided by the programmable gain amplifier 208 and the greater gain is provided by the second gain stage 232, and, the darker the environment is, the greater gain is provided by the programmable gain amplifier 208 and the lower gain is provided by the second gain stage 232. The gain of the programmable gain amplifier 208 and the gain of the second gain stage 232 may be controlled according to an auto-exposure algorithm.

In one exemplary embodiment, the first and second gain stages 228 and 232 are implemented by two switched-capacitor gain stages, respectively. The two switched-capacitor gain stages have a matching design: identical architectures and synchronized switching control. In this manner, the light beating problem of the captured video is effectively solved.

This paragraph discusses the digital black level calibration unit 212. The digital black level calibration unit 212 may comprise a digital gain stage 234 and a digital black level calibrator 236. The digital gain stage 234 amplifies the first digital signal 224 by a digital gain to generate a second digital signal 238. The digital black level calibrator 236 transforms the second digital signal 238 to the black level calibrated digital data 204 in different color spaces. Note that the digital gain provided within the digital gain stage 234 is compensated for by the digital black level calibrator 236. Thus, the dynamic range of the black level calibrated digital data 236 is guaranteed.

As shown in FIG. 2, the disclosed readout circuit 200 may further comprises an offset calibrator 240. The offset calibrator 240 acts when the sensed signal 202 is from the pixel sensors within the dark region 102 of the image sensor 100, to optimize a selection signal 242 of the multiplexer 230 based on the first digital signal 224 (or the second digital signal 238 amplified from the first digital signal 224). When the sensed signal 202 is from the pixel sensors beyond the dark region (i.e. within the active region 104 of the image sensor 100), the offset calibrator 240 is disabled and the multiplexer 230 is controlled by the optimized selection signal 242. With the optimized selection signal 242, the sensor characteristics of the image sensor 100 are properly considered when generating the black reference 216 for the sensed signal 202 received from the pixel sensors within the active region 104.

In one exemplary embodiment, the readout circuit 200 is in a single-ended circuit configuration. Or, for a wider dynamic range, the readout circuit 200 may be designed to have a fully differential circuit configuration.

Figure 3:
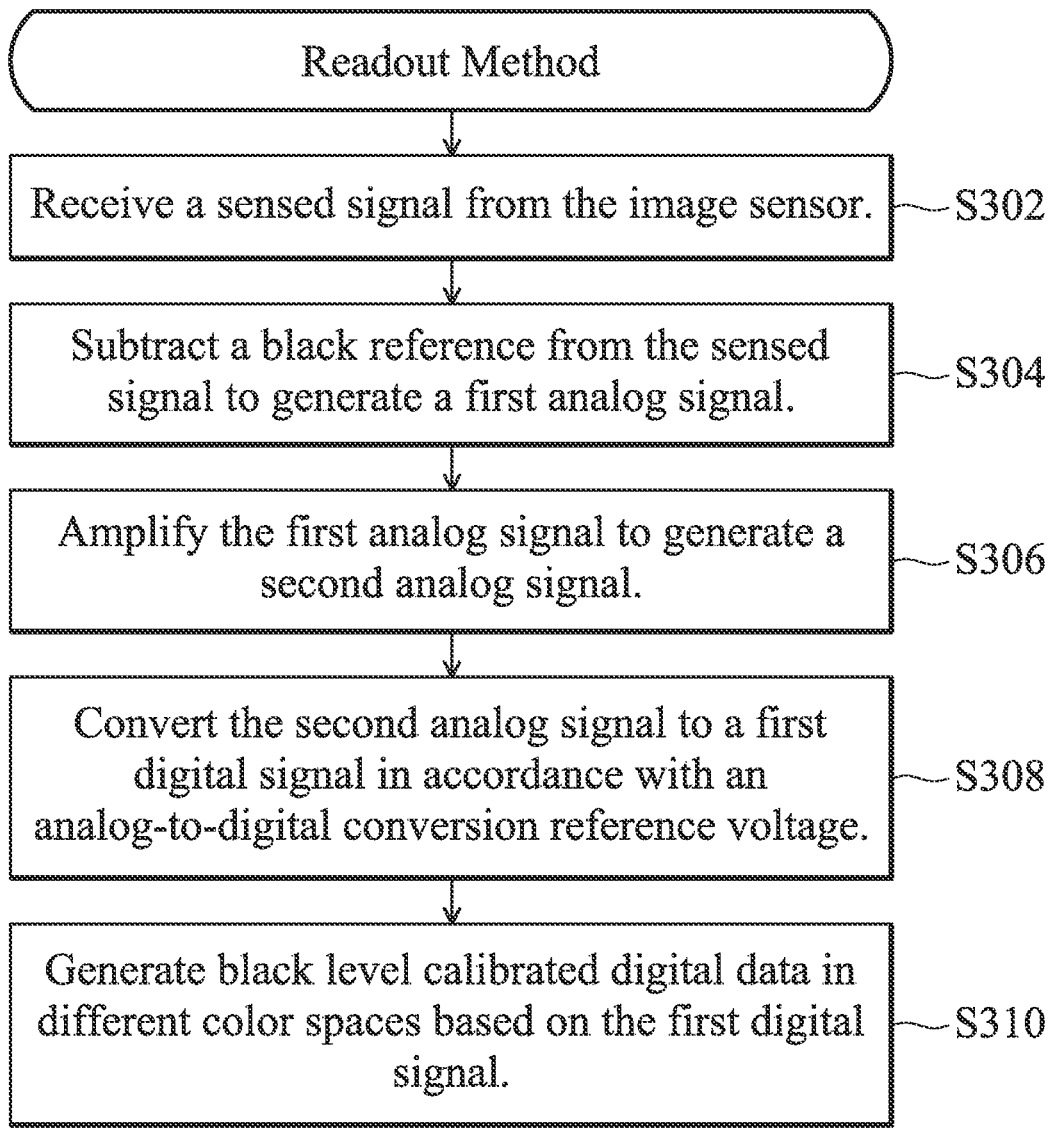
FIG. 3 is a flowchart depicting a readout method for one pixel sensor.

FIG. 3 is a flowchart depicting a readout method for one pixel sensor of an image sensor, which may be implemented by firmware, hardware comprising hardware logic, or any combination thereof. In step S302, a sensed signal is received from the image sensor. In step S304, a black reference is subtracted from the sensed signal to generate a first analog signal. In step S306, the first analog signal is amplified to generate a second analog signal. In step S308, the second analog signal is converted to a first digital signal in accordance with an analog-to-digital conversion reference voltage. In step S310, black level calibrated digital data in different color spaces are generated based on the first digital signal. Note that the analog-to-digital conversion reference voltage used in step S308 is generated by amplifying a specific one of a plurality of reference voltages generated by a voltage ladder. Further, the black reference used in step S302 is generated by amplifying one of plurality of reference voltages selected according to sensor characteristics of the image sensor, and, a gain between the selected reference voltage and the black reference varies with a gain between the first and second analog signals. The readout method shown in FIG. 3 for one pixel sensor may be repeated over the pixel sensors within an active region of the image sensor, for capturing a complete frame.

In one exemplary embodiment, two switched-capacitor gain stages having a matching design (in identical architectures and synchronized switching control) may be provided to implement the generation of the analog-to-digital conversion reference voltage and the black reference.

Figure 4:
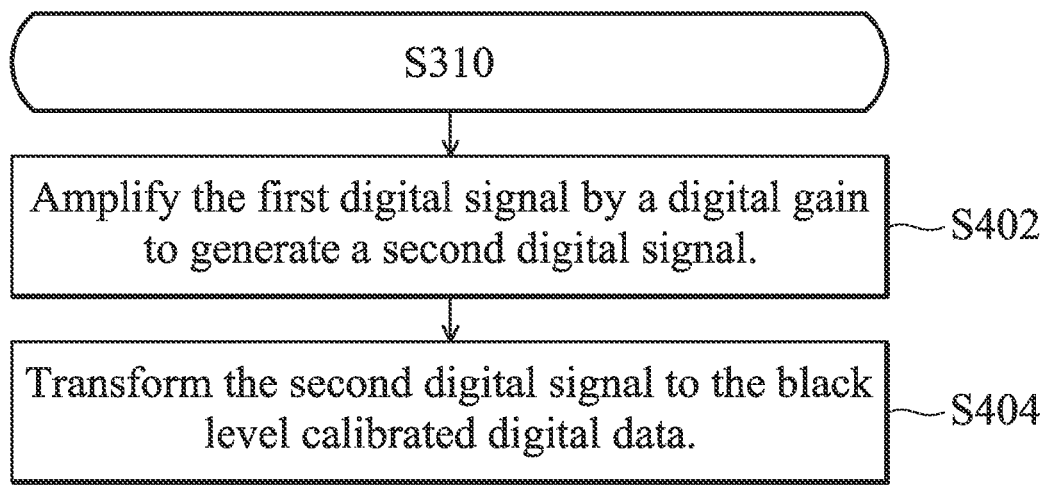
FIG. 4 is a flowchart depicting an exemplary embodiment of the step S310, which shows a scheme for generating the black level calibrated digital data.

FIG. 4 is a flowchart depicting an exemplary embodiment of step S310, which is a scheme for generating the black level calibrated digital data. In step 402, the first digital signal is amplified by a digital gain to generate a second digital signal. In step S404, the second digital signal is transformed to the black level calibrated digital data. Note that the digital gain between the first and the second digital signals is compensated for when transforming the second digital signal to the black level calibrated digital data.

In one exemplary embodiment, the reference voltage selected for generating the black reference is determined based on the first digital signal when the sensed signal is from the pixel sensors within a dark region of the array. The pixel sensors within the dark region are shielded from light.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A digital camera, comprising
an image sensor comprising an array of pixel sensors;
a readout circuit, coupled to the image sensor to receive a sensed signal and comprising:
   a compensator, subtracting a black reference from the sensed signal to generate a first analog signal;
   a programmable gain amplifier, amplifying the first analog signal to generate a second analog signal;
   an analog-to-digital converter, controlled by an analog-to-digital conversion reference voltage to convert the second analog signal to a first digital signal;
   a digital black level calibration unit, generating black level calibrated digital data in different color spaces based on the first digital signal; and
   a feed-forward control design comprising:
      a voltage ladder, generating reference voltages of different levels;
      a first gain stage, amplifying a specific one of the reference voltages to generate the analog-to-digital conversion reference voltage;
      a multiplexer, receiving the reference voltages generated by the voltage ladder and outputting one of the received reference voltages according to sensor characteristics of the image sensor; and
      a second gain stage, amplifying the reference voltage output from the multiplexer to generate the black reference, wherein a gain of the second gain stage varies with a gain of the programmable gain amplifier.

2. The digital camera as claimed in claim 1, wherein the first and second gain stages are switched-capacitor gain stages synchronized with each other.

3. The digital camera as claimed in claim 1, wherein the digital black level calibration unit comprises:
   a digital gain stage, amplifying the first digital signal by a digital gain to generate a second digital signal; and
   a digital black level calibrator, transforming the second digital signal to the black level calibrated digital data, wherein the digital gain provided within the digital gain stage is compensated for by the digital black level calibrator.

4. The digital camera as claimed in claim 1, having a single-ended circuit configuration.

5. The digital camera as claimed in claim 1, having a fully differential circuit configuration.

6. The digital camera as claimed in claim 1, wherein the pixel sensors within a dark region of the array are shielded from light.

7. The digital camera as claimed in claim 6, further comprising:
   an offset calibrator, optimizing a selection signal of the multiplexer based on the first digital signal when the sensed signal is from the pixel sensors within the dark region.

8. The digital camera as claimed in claim 7, wherein the multiplexer is controlled by the optimized selection signal when the sensed signal is from the pixel sensors beyond the dark region.

9. An image sensor readout method with black level calibration for a digital camera, comprising:
   receiving a sensed signal from the image sensor which comprises an array of pixel sensors;
   subtracting a black reference from the sensed signal to generate a first analog signal;
   amplifying the first analog signal to generate a second analog signal;
   converting the second analog signal to a first digital signal in accordance with an analog-to-digital conversion reference voltage; and
   generating black level calibrated digital data in different color spaces based on the first digital signal,
   wherein:
      the analog-to-digital conversion reference voltage is generated by amplifying a specific one of a plurality of reference voltages generated by a voltage ladder; and
      the black reference is generated by amplifying one of the plurality of reference voltages selected according to sensor characteristics of the image sensor, wherein a gain between the selected reference voltage and the black reference varies with a gain between the first and second analog signals.

10. The image sensor readout method as claimed in claim 9, further providing switched-capacitor gain stages, synchronized with each other, to implement the generation of the analog-to-digital conversion reference voltage and the black reference.

11. The image sensor readout method as claimed in claim 9, wherein a scheme for generating the black level calibrated digital data comprises:
   amplifying the first digital signal by a digital gain to generate a second digital signal; and
   transforming the second digital signal to the black level calibrated digital data,
   wherein the digital gain between the first and the second digital signals is compensated for when transforming the second digital signal to the black level calibrated digital data.

12. The image sensor readout method as claimed in claim 9, wherein the reference voltage selected for generating the black reference is determined based on the first digital signal when the sensed signal is from the pixel sensors within a dark region of the array, and, the pixel sensors within the dark region are shielded from light.

* * * * *